United States Patent
Chiu et al.

(10) Patent No.: US 12,200,561 B2
(45) Date of Patent: Jan. 14, 2025

(54) SYSTEMS AND METHODS FOR DYNAMIC HANDOVER THRESHOLD ADJUSTMENT BASED ON CELL LOAD IN A WIRELESS NETWORK

(71) Applicant: Verizon Patent and Licensing Inc., Basking Ridge, NJ (US)

(72) Inventors: Chin Chiu, Allen, TX (US); Md Abu Sayem Sarker, Suwanee, GA (US); Marcus W. Maples, Winston, GA (US); Abhishek Shah, Lawrenceville, GA (US); Asif Dawoodi Gandhi, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 361 days.

(21) Appl. No.: 17/660,435

(22) Filed: Apr. 25, 2022

(65) Prior Publication Data
US 2023/0345336 A1    Oct. 26, 2023

(51) Int. Cl.
*H04W 36/30*    (2009.01)
(52) U.S. Cl.
CPC .................. *H04W 36/30* (2013.01)
(58) Field of Classification Search
CPC .................................. H04W 36/30
See application file for complete search history.

(56) References Cited

U.S. PATENT DOCUMENTS

| | | | | |
|---|---|---|---|---|
| 10,285,074 | B1* | 5/2019 | Pankajakshan | ....... H04W 76/19 |
| 2022/0210706 | A1* | 6/2022 | Parekh | .............. H04W 36/0085 |
| 2024/0137827 | A1* | 4/2024 | Li | ......................... H04W 36/08 |

OTHER PUBLICATIONS

ETSI TS 138 215 V16.4.0, "5G; NR; Physical layer measurements," available at https://www.etsi.org/deliver/etsi_ts/138200_138299/138215/16.04.00_60/ts_138215v160400p.pdf (Jan. 2021).
ETSI TS 131 102 V15.2.0, "Universal Mobile Telecommunications System (UMTS); LTE; Characteristics of the Universal Subscriber Identity Module (USIM) application," available at https://www.etsi.org/deliver/etsi_TS/131100_131199/131102/15.02.00_60/ts_131102v150200p.pdf (Oct. 2018).

* cited by examiner

*Primary Examiner* — Ricky Q Ngo
*Assistant Examiner* — Stephen N Steiner

(57) ABSTRACT

A system described herein may receive respective measures of load associated with first and second cells of a wireless network. The system may receive a measures of utilization associated with the first and second cells, as determined by a User Equipment ("UE") that is connected to the first cell. The system may determine whether the UE should be handed over from the first cell to the second cell, and further based on the measures of load associated with the first and second cells, the measures of utilization associated with the first and second cells, as determined by the UE. The system may cause the UE to be handed over from the first cell to the second cell based on the determining.

20 Claims, 10 Drawing Sheets

SYSTEMS AND METHODS FOR DYNAMIC HANDOVER THRESHOLD ADJUSTMENT BASED ON CELL LOAD IN A WIRELESS NETWORK

BACKGROUND

Wireless user equipment ("UE"), such as mobile telephones or other wireless communication devices, may communicate with wireless network infrastructure of one or more wireless networks, such as base stations of one or more radio access networks ("RANs"). A particular base station may implement one or more cells, where different cells may be associated with different frequency bands, different sectors or geographical locations, radio access technologies ("RATs"), antennas, or other differentiating factors. A UE may participate in a handover from one base station, cell, etc. to another based on factors such as radio frequency ("RF") signal quality.

DETAILED DESCRIPTION OF EXAMPLE EMBODIMENTS

Figure 1:
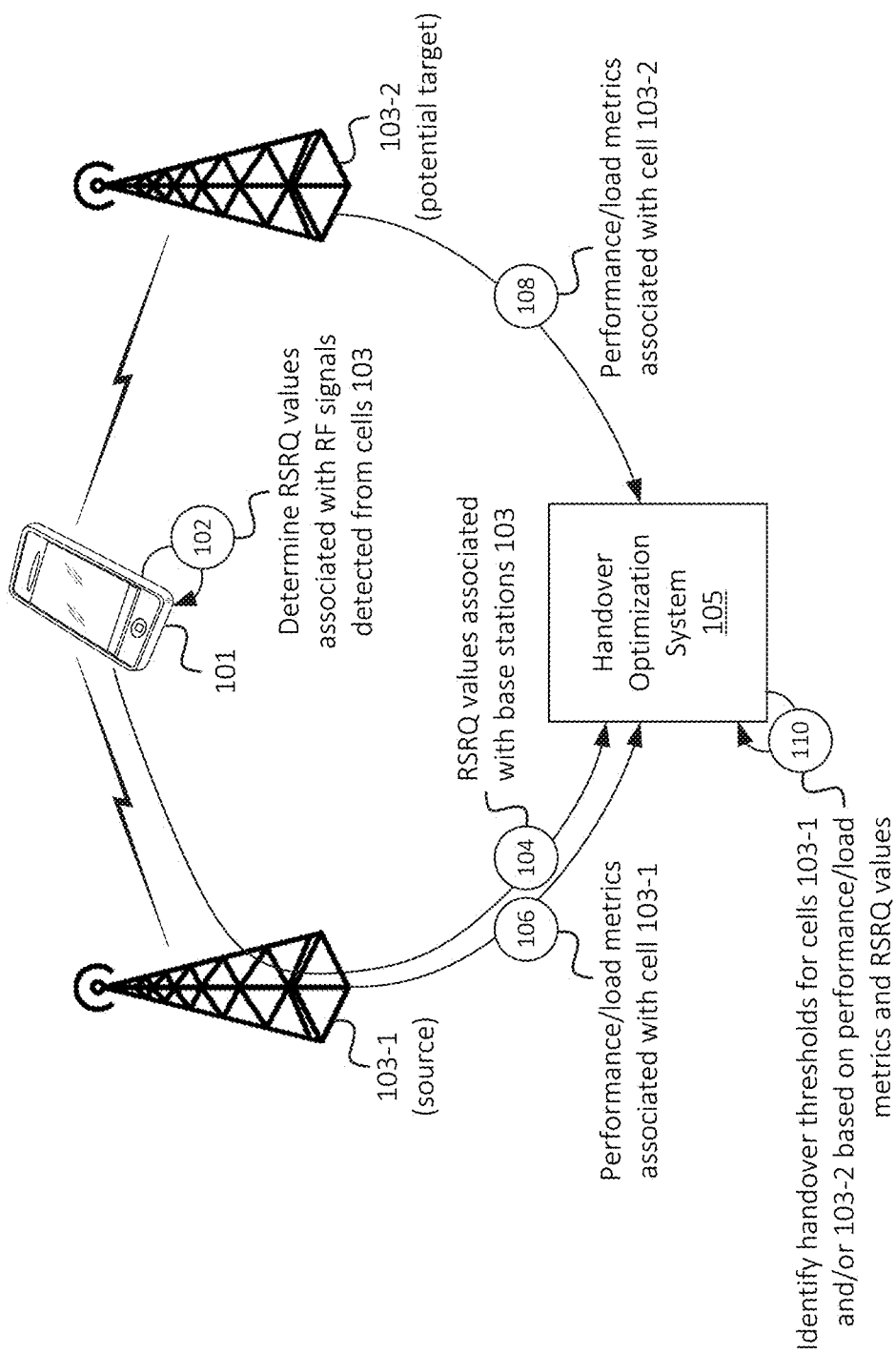
FIG. 1 illustrates an example overview of one or more embodiments described herein.

The following detailed description refers to the accompanying drawings. The same reference numbers in different drawings may identify the same or similar elements.

Embodiments described herein provide for the dynamic adjustment of handover thresholds in a wireless network based on load metrics associated with one or more cells of the wireless network, and signal metrics associated with communications between cells of the wireless network and one or more UEs. For example, a wireless network may include one or more RANs, which may include one or more cells. Cells may be implemented by wireless network infrastructure such as base stations (e.g., evolved Node Bs ("eNBs"), Next Generation Node Bs ("gNBs"), or the like). For example, different cells may refer to different base stations, and/or may refer to different components, devices, attributes, configurations, etc. of the same base station. For example, different cells may refer to different frequency bands implemented by the same base station or by multiple different base stations, different RATs implemented by the same base station or by multiple different base stations, different physical antennas of the same base station or of multiple different base stations, etc.

A UE, such as a mobile telephone, a tablet, an Internet of Things ("IoT") device, an Machine-to-Machine ("M2M") device, etc., may receive wireless connectivity via the wireless network infrastructure, and may be logically associated with (e.g., connected to) one or more cells implemented by such wireless network infrastructure. In some situations, the UE may be handed over, redirected, etc. from one cell to another, such as based on UE movement from one geographical location to another, wireless interference, increased or reduced demand or capacity via one or more cells, increased or reduced signal quality, etc.

UEs may, on an ongoing basis, detect the presence of cells that are within wireless communication range of the UEs. The UEs may determine characteristics, metrics, etc. of wireless signals or channels between the UEs and the detected cells, and may generate measurement reports or other values based on the determined characteristics, metrics, etc. A measurement report provided by a given UE may include, for example, Reference Signal Received Power ("RSRP") values, Reference Signal Received Quality ("RSRQ") values, and/or one or more other values based on wireless signals detected from one or more cells by the UE over a particular timeframe.

One or more of the values included in the measurement reports may be indicative of, dependent on, and/or otherwise based on a measure of resource utilization associated with a given cell with which the values are associated. For example, an RSRQ value for a given cell may vary based on a total amount of RF power detected from the given cell (e.g., Received Signal Strength Indicator ("RSSI") associated with the given cell or some other suitable measure of total power). Cells may be associated with a finite amount or capacity (e.g., a predetermined amount or capacity) of RF resources, such as Physical Resource Blocks ("PRBs"), Resource Elements ("REs"), etc. A cell that utilizing a greater amount or proportion of such RF resources within a given duration may be considered as being more heavily utilized than a cell utilizing a lesser amount or proportion of RF resources within the given duration. Thus, when the cell is relatively heavily utilized (e.g., is wirelessly transmitting a relatively large amount of data), the total amount of RF power detected from the cell may be relatively higher, and the RSRQ for the cell may accordingly be relatively lower. On the other hand, when the cell is relatively lightly utilized (e.g., is wirelessly transmitting a relatively small amount of data), the total amount of RF power detected from the cell may be relatively lower, and the RSRQ for the cell may accordingly be relatively higher.

On the other hand, one or more values included in the measurement reports may be independent of utilization of RF resources of a cell (herein referred to simply as "utilization" for the sake of brevity), such as RSRP values that are based on reference signals outputted by cells. In some embodiments, such RSRP values may include Synchronization Signal ("SS") RSRP ("SS-RSRP") values, based on reference signals outputted by a base station in a SS block ("SSB"). Regardless of the amount of utilization at a given cell, the cell may output a static amount of reference signals based on which a UE may determine an RSRP value for the given cell. That is, a measure of utilization of RF resources of the cell may not be a factor that affects the outputting of reference signals by the cell.

In accordance with embodiments described herein, utilization metrics associated with cells (e.g., signal quality metrics that are based on utilization metrics, such as RSRQ metrics) may be used in the determination of handover thresholds or other metrics based on which UEs are handed over from one cell to another. Specifically, for example, some embodiments may utilize handover thresholds that are based on cell RF resource utilization-based signal metrics (referred to herein as "utilization metrics" for the sake of brevity), such as cell signal quality and/or utilization metrics included in measurement reports provided by UEs (e.g., RSRQ or other suitable metrics), in order to determine whether to hand over a UE from one cell to another. Further, in some embodiments, the handover thresholds (e.g., based on RSRQ metrics and/or other metrics) may be refined, modified, etc. using modeling techniques such as artificial intelligence/machine learning ("AI/ML") techniques, in order to optimize UE performance, quality of service ("QoS") metrics, or other suitable metrics, thus enhancing the user experience of users of such UEs. Additionally, using utilization metrics and/or signal quality metrics that are based on utilization metrics, as measured by UEs, in conjunction with load and/or performance metrics associated with cells (e.g., to which the UEs are connected and/or which are handover candidates for such UEs) may provide for more reliable and/or accurate handover thresholds, thus enhancing the overall performance of a wireless network and UEs receiving wireless service from the wireless network.

As shown in FIG. 1, UE 101 may be connected to a first cell 103-1. For example, UE 101 and cell 103-1 may have performed a Radio Resource Control ("RRC") connection establishment procedure, a random access procedure, and/or some other suitable procedure to establish a connection between UE 101 and cell 103-1. While UE 101 is connected to cell 103-1, UE 101-2 may detect wireless signals from one or more other cells, such as potential target cell 103-2. For example, potential target cell 103-2 may be implemented by wireless network infrastructure that is within wireless communication range of UE 101, such that UE 101 is able to detect RF signals transmitted by potential target cell 103-2. In this manner, cell 103-1 may be referred to as a "source" cell, while cell 103-2 may be referred to as a "potential target" cell, inasmuch as cell 103-2 is a potential target for handover with respect to UE 101.

As noted above, cells 103-1 and 103-2 may each be implemented by one or more wireless network infrastructure elements, such as one or more base stations, antennas, transceivers, etc. For example, cells 103-1 and 103-2 may be implemented by different wireless network infrastructure elements, or, in some situations, by the same wireless network infrastructure elements. In some embodiments, cells 103-1 and 103-2 may be, or may be implemented by, two different base stations, two different antennas (e.g., of the same base station or of different base stations), etc. In some embodiments, cells 103-1 and 103-2 may correspond to the same frequency band (e.g., as implemented by different wireless network infrastructure elements, such as different base stations), and/or may correspond to different frequency bands (e.g., as implemented by one base station or by different base stations). For the sake of explanation, cells 103-1 and 103-2 are illustrated in the drawings as two separate wireless network infrastructure elements, but similar concepts as described herein may apply when cells 103-1 and 103-2 are implemented by the same wireless network infrastructure element, the same device or set of devices, etc.

UE 101 may determine (at 102) RSRQ values and/or other suitable utilization and/or signal quality metrics associated with RF signals detected from cells 103-1 and/or 103-2. For example, UE 101 may detect RF signals from cells 103-1 and 103-2, and may calculate, compute, and/or otherwise determine metrics associated with signal strength, signal quality, etc. of the detected signals. In some embodiments, such metrics may include RSRP values, RSSI values, RSRQ values, Signal-to-Interference-and-Noise-Ratio ("SINR") values, and/or other suitable values.

As noted above, RSRQ values, as determined (at 102) by UE 101 may be based on cell RF resource utilization by a given cell 103. For example, an RSRQ value for a particular cell 103 during a particular time period T may be determined as $RSRQ_T = N*RSRP_T/RSSI_T$, where N refers to an amount of bandwidth (e.g., quantity of resource blocks) associated with the particular cell, $RSRP_T$ refers to an RSRP metric (e.g., received power of reference signals broadcasted by the particular cell) associated with time period T, and $RSSI_T$ refers to a total amount of received power of RF signals transmitted by the particular cell and received by UE 101 during time period T.

Thus, in situations where cell utilization is relatively high (e.g., when cell 103 is utilizing a relatively large amount or proportion of RF resources and/or when UE 101 has detected a relatively large amount of RF signals from cell 103), $RSSI_T$ may be relatively high, and the $RSRQ_T$ may accordingly be relatively low. On the other hand, in situations where cell RF resource utilization is relatively low (e.g., when the cell is transmitting a relatively small amount of RF signals), $RSSI_T$ may be relatively low, and the $RSRQ_T$ may accordingly be relatively high. That is, in situations in which the only difference is the amount of RF resource utilization of cell 103, the RSRQ values determined by UE 101 with respect to cell 103 may be higher in the situation where cell 103 is utilizing fewer RF resources. RSRQ values are used herein as an example of a signal quality metric that is based on utilization metrics of a given cell 103, as measured by UE 101. In practice, similar concepts may apply to other measures of resource utilization of cell 103 (e.g., as computed by UE 101, and/or as derived or computed based on metrics determined or measured by UE 101).

UE 101 may determine (at 102) utilization metrics, signal quality metrics, etc. associated with cells 103-1 and 103-2 on an ongoing basis, such as on a periodic or intermittent basis. Such utilization metrics may include, may be based on, for example, RSRQ values and/or other suitable metrics measured or determined by UE 101 with respect to cells 103-1 and 103-2. UE 101 may further provide (at 104) one or more of the determined utilization metrics, RSRQ values, etc. to Handover Optimization System ("HOS") 105 on an ongoing basis, such as on a periodic or intermittent basis. In this manner, UE 101 and/or HOS 105 may monitor the utilization metrics, signal quality metrics, etc. associated with cells 103-1 and 103-2 (e.g., with respect to UE 101) over time.

In some embodiments, UE 101 may refrain from searching for cells 103 or determining (at 102) metrics associated with cells 103 if one or more metrics associated with a source cell (e.g., cell 103-1 in this example), to which UE 101 is currently connected, exceed one or more thresholds. For example, if RSRQ metrics, RSRP metrics, etc. associated cell 103-1, as measured by UE 101, are above a threshold value, then UE 101 may refrain from searching for additional cells 103. In some embodiments, UE 101 may receive instructions (e.g., from HOS 105 or some other source) to begin or cease searching for cells 103. In some embodiments, HOS 105 may provide such instructions based on performance and/or load metrics associated with one or more cells 103 (e.g., cell 103-1 to which UE 101 is currently connected). For example, if cell 103-1 is relatively heavily loaded, HOS 105 may instruct UE 101 to search for additional cells 103 when RSRQ metrics associated with UE 101 and cell 103-1 are at a first threshold. On the other hand, if cell 103-1 is relatively lightly loaded, HOS 105 may instruct UE 101 to search for additional cells 103 when RSRQ metrics associated with UE 101 and cell 103-1 are at a different, second threshold (e.g., a higher threshold). Examples of performance and/or load metrics associated with cells 103 are discussed in greater detail below.

In some embodiments, UE 101 may provide (at 104) the utilization metrics, RSRQ values, etc. to HOS 105 via one or more application programming interfaces ("APIs") or other suitable communication pathways. In some embodiments, UE 101 may provide the RSRQ values and/or other information to cell 103-1 to which UE 101 is connected, and cell 103-1 may provide the RSRQ values and/or other information to HOS 105 via an API or other suitable communication pathway. In some embodiments, some or all of the functionality of HOS 105 may be implemented by the same device or set of devices that implement cell 103-1. In some embodiments, the RSRQ values and/or other information may be provided by UE 101 via one or more measurement reports or other messages in which UE 101 provides measurements of RF signals transmitted by one or more cells 103, as detected by UE 101.

HOS 105 may also monitor (at 106 and 108, respectively) performance and/or load metrics associated with cells 103-1 and 103-2. For example, Cells 103-1 and 103-2 may provide (at 106 and 108, respectively) such information to HOS 105 on an ongoing basis via one or more APIs or other suitable communication pathways. The performance and/or load metrics may include load metrics such as a quantity of UEs 101 connected to each respective cell 103, an amount of available RF resources (e.g., resource blocks ("RBs") and/or resource elements ("REs") at each respective cell 103, an amount of utilized RF resources at each cell 103, and/or other metrics indicating a measure of load at each respective cell 103. In some embodiments, the load metrics may include an average, median, or other computed value based on a quantity of RBs utilized over a particular time window, such as rolling or sliding time window (e.g., the most recent two weeks, the most recent month, the most recent five minutes, or some other time window).

The performance and/or load metrics may include performance metrics such as a measure of throughput of downlink and/or uplink data provided to and/or from UEs 101 connected to respective cells 103 (e.g., an average throughput, a median throughput, a maximum throughput, a minimum throughput, etc. of data sent to and/or from UEs 101), a measure of latency of traffic sent to and/or from UEs 101 connected to respective cells 103, and/or other information indicating performance related to data sent to and/or received from UEs 101 connected to respective cells 103.

In some embodiments, the performance metrics may include and/or may be based on whether QoS thresholds, Service Level Agreements ("SLAs"), etc. associated with UEs 101 connected to respective cells 103 are met. For example, if a given UE 101 is associated with a QoS threshold indicating a maximum latency of 20 milliseconds ("ms") and the given UE 101 received traffic with a latency of 30 ms over a given time period, the performance metrics may indicate that the QoS threshold associated with the given UE 101 over the given time period was not met, and/or may indicate a degree to which the QoS threshold was not met (e.g., may indicate that the latency threshold was exceeded by 10 ms). In some embodiments, the performance and/or load metrics may include one or more scores (e.g., as generated by cells 103 and/or by HOS 105). For example, a relatively low score associated with a particular cell 103 may indicate a relatively high measure of load and/or a relatively low measure of performance at the particular cell 103, while a relatively high score associated with a particular cell 103 may indicate a relatively low measure of load and/or a relatively high measure of performance at the particular cell 103.

In some embodiments, cells 103-1 and 103-2 may provide configuration parameters to HOS 105, and/or HOS 105 may receive such configuration parameters from a device or system associated with one or more wireless networks with which cells 103-1 and 103-2 are associated. For example, HOS 105 may receive such information from a Network Repository Function ("NRF"), may receive such information via a Service Capability Exposure Function ("SCEF") or Network Exposure Function ("NEF"), and/or may receive such information in some other suitable manner or from some other source. The configuration parameters may include, for example, frequency bands implemented by respective potential target cells 103 (e.g., Advanced Wireless Services ("AWS") band, Ultra-Wide Band ("UWB"), millimeter-wave ("mmWave") band, etc.), quantity of antennas, beamforming parameters (e.g., azimuth angle, antenna power, etc. of one or more antennas), and/or other configuration parameters of cells 103.

Based on the received and/or monitored (at 104) RSRQ values or other utilization and/or signal quality signal metrics and the received and/or monitored (at 106 and/or 108) performance and/or load metrics associated with cells 103-1 and/or 103-2, HOS 105 may identify (at 110) a set of handover thresholds associated with cells 103-1 and/or 103-2. For example, as discussed below, such thresholds may include thresholds that are based on RSRQ values (and/or other utilization-based signal metrics) associated with UEs 101, performance and/or load metrics associated with one or more cells 103 (e.g., a source cell 103-1 to which UE 101 is connected and/or a potential target cell 103-2 which is a candidate for handover with respect to UE 101), or a combination of utilization metrics (e.g., RSRQ values and/or other signal metrics based on utilization metrics) and performance and/or load metrics.

In some embodiments, HOS 105 may generate, maintain, refine, etc. one or more models (e.g., predictive models, statistical models, AI/ML models, etc.) that associate different criteria, parameters, conditions, etc. with different sets of handover thresholds. Based on such models, HOS 105 may identify (at 110) the set of handover thresholds associated with UE 101, source cell 103-1, and potential target cell 103-2.

Figure 2:
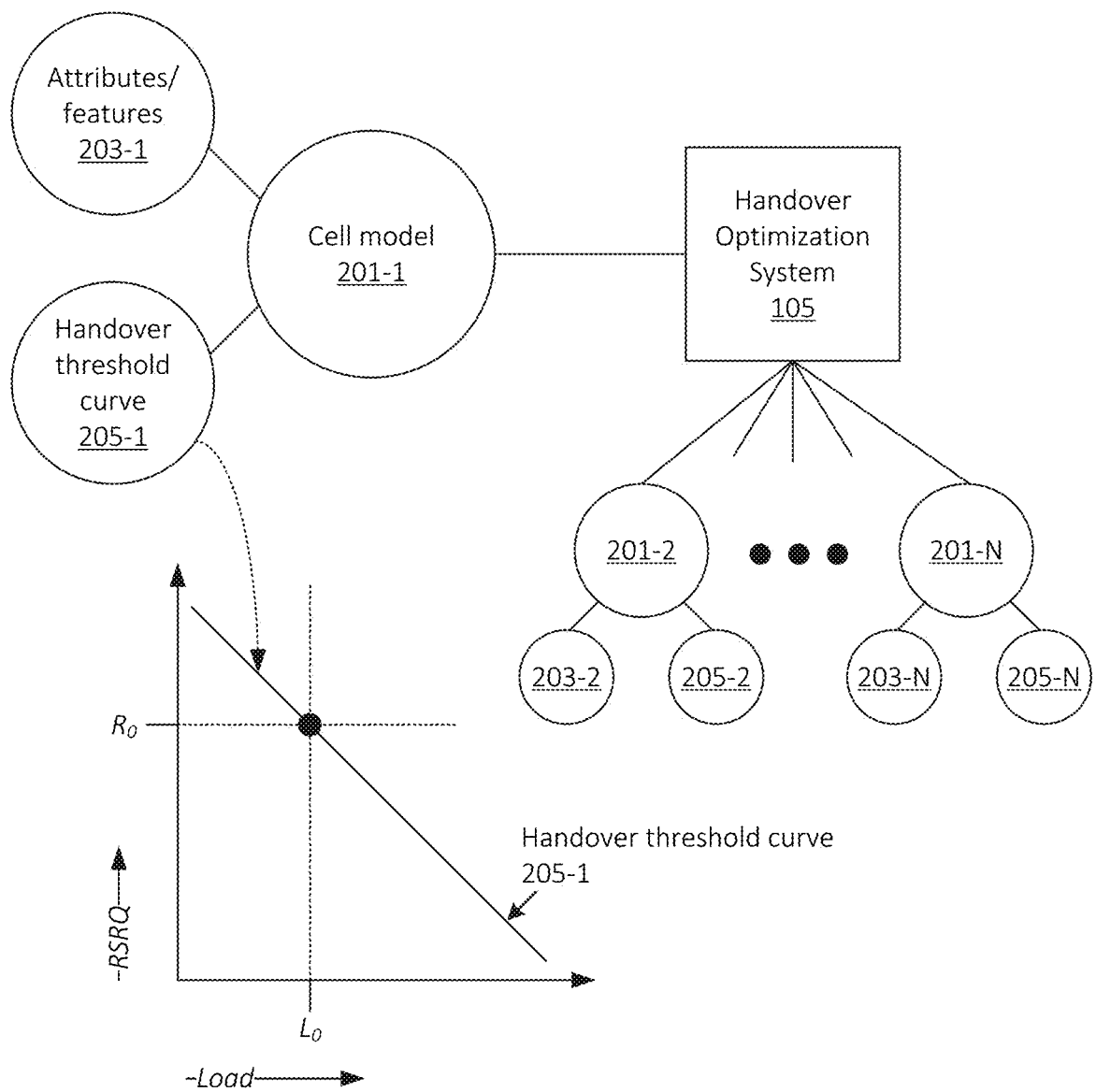
FIG. 2 illustrates example cell models, including handover threshold curves, that may be associated with one or more cells, in accordance with some embodiments.

For example, as shown in FIG. 2, HOS 105 may maintain a set of cell models 201-1 through 201-N. Different cell models 201 may be associated with different sets of attributes and/or features 203. Attributes and/or features 203 associated with such models may be based on different conditions, attributes, etc., such as temporal conditions (e.g., different times of day, day of the week, season, etc.), which may reflect situations in which load and/or performance metrics may vary based on such temporal conditions. For example, one cell model 201 and/or set of attributes and/or features 203 may be associated with weekday mornings (e.g., where a cell 103 located in a downtown or suburban environment may experience relatively heavy load during such times), while another cell model 201 and/or set of attributes and/or features 203 may be associated with weekends (e.g., where the same cell 103 located in the downtown or suburban environment may experience relatively light load during such times).

As another example, different attributes and/or features 203 of different cell models 201 may be associated with different cell configuration parameters, such as based on different frequency bands, quantity of transmit antennas, or other different cell configuration parameters. As yet another example, different attributes and/or features 203 of different cell models 201 may be associated with different geographical locations, air quality or weather conditions, building density, topographical features, and/or attributes or features of a locale in which a given cell 103 is located.

Further, different cell models 201 may be associated with different handover threshold curves 205. For example, a particular handover threshold curve may include associations of a set of RSRQ values (and/or other suitable signal metrics, such as utilization metrics and/or signal metrics based on utilization metrics) to a set of cell performance and/or load metrics. For example, a handover curve may include utilization metrics (and/or other suitable metrics) as a function of cell load and/or performance metrics, where utilization metrics (and/or other signal metrics that are based on utilization metrics, such as RSRQ metrics) falling on the curve may be handover thresholds used as described herein.

As noted above, measures of performance and/or load associated with a given cell 103 may include and/or may be based on information such as quantity of connected UEs 101 at the given cell 103, QoS information associated with UEs 101 connected to the given cell 103, one or more performance and/or load scores, and/or other suitable information. In the examples herein, such information is referred to simply as "load" for the sake of simplicity. Further, in the examples herein, threshold utilization metrics may be described in the context of RSRQ values measured by one or more UEs 101, which may be based on signal strength metrics (e.g., RSRP, RSSI, or other suitable metrics) measured by such UEs 101.

Example handover threshold curve 205-1 may, for example, indicate that if a given cell 103 is associated with a particular measure of load $L_0$, then the handover threshold for UEs 101 associated with cell 103 is a particular RSRQ value $R_0$. Generally, example handover threshold curve 205-1 may indicate that higher measures of load are associated with lower threshold RSRQ values. For example, if a particular cell 103 is relatively heavily loaded, a particular RSRQ value may indicate relatively higher signal quality than the same RSRQ value if the same particular cell 103 is relatively less heavily loaded.

Figure 3:
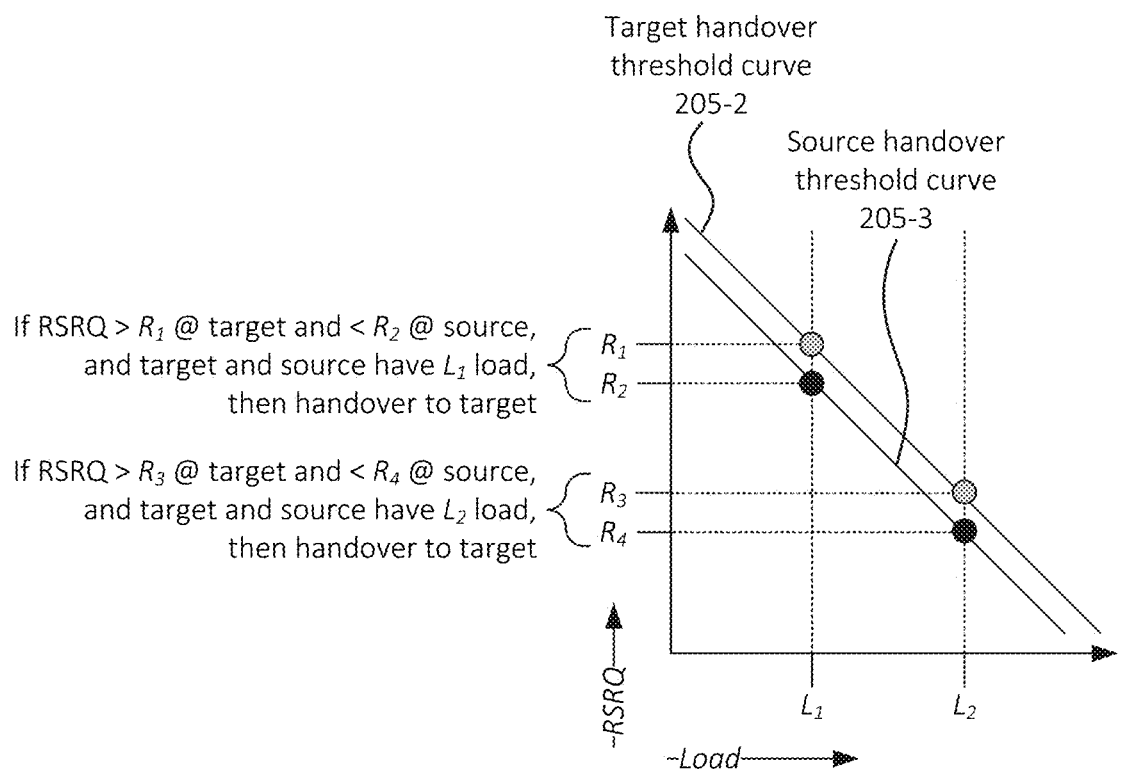
FIGS. 3 and 4 illustrate example sets of handover thresholds based on particular load metrics and signal metrics, in accordance with some embodiments.

As shown in FIG. 3, handover threshold curves 205 may be used to indicate threshold RSRQ values (or other utilization-based signal metrics) based on which a given UE 101 should be handed over from a source cell 103 and/or to a target cell 103. For example, assume that example handover threshold curve 205-2 corresponds to potential target cell 103-2, and that handover threshold curve 205-3 corresponds to source cell 103-1 to which UE 101 is currently connected. In situations where handover thresholds associated with both source cell 103-1 and potential target cell 103-2 are met, UE 101 may be handed over from source cell 103-1 to potential target cell 103-2 (e.g., source cell 103-1 may initiate a handover, UE 101 and/or potential target cell 103-2 may request that source cell 103-1 initiate a handover, and/or UE 101 may be handed over by some other suitable mechanism.

For example, in a situation where source cell 103-1 and potential target cell 103-2 are both associated with the same particular measure of load $L_1$, a handover condition of UE 101 from source cell 103-1 to potential target cell 103-2 may be identified if an RSRQ value associated with potential target cell 103-2 (e.g., as measured by UE 101) is greater than threshold RSRQ value $R_1$ and if an RSRQ value associated with source cell 103-1 (e.g., as measured by UE 101) is below threshold RSRQ value $R_2$. As further shown, in a situation where source cell 103-1 and potential target cell 103-2 are both associated with the same particular measure of load $L_2$, a handover condition of UE 101 from source cell 103-1 to potential target cell 103-2 may be identified if an RSRQ value associated with potential target cell 103-2 is greater than threshold RSRQ value $R_3$ and if an RSRQ value associated with source cell 103-1 is below threshold RSRQ value $R_4$.

Figure 4:
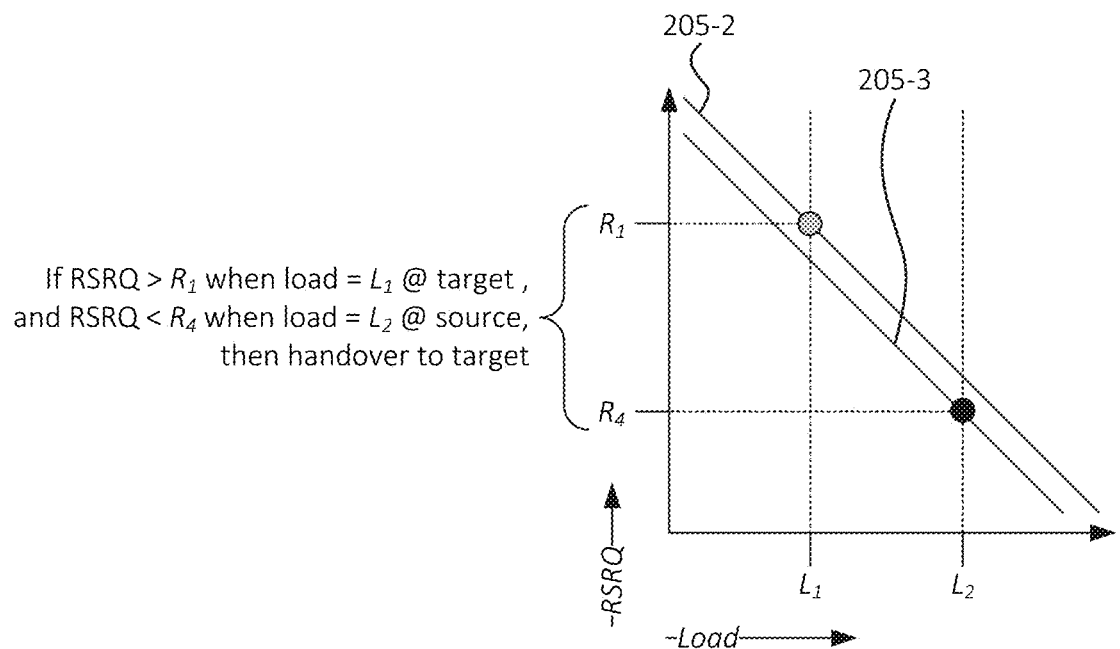

Handover threshold curves 205 associated with source and potential target cells 103 may also be used to identify handover thresholds in situations where source and potential target cells 103 are associated with different measures of load. For example, as shown in FIG. 4, in a situation where potential target cell 103-2 is associated with a first measure of load $L_1$ and source cell 103-1 is associated with a second measure of load $L_2$, a handover condition of UE 101 from source cell 103-1 to potential target cell 103-2 may be identified if an RSRQ value associated with potential target cell 103-2 is greater than threshold RSRQ value $R_1$ and if an RSRQ value associated with source cell 103-1 is below threshold RSRQ value $R_4$.

Figure 5:
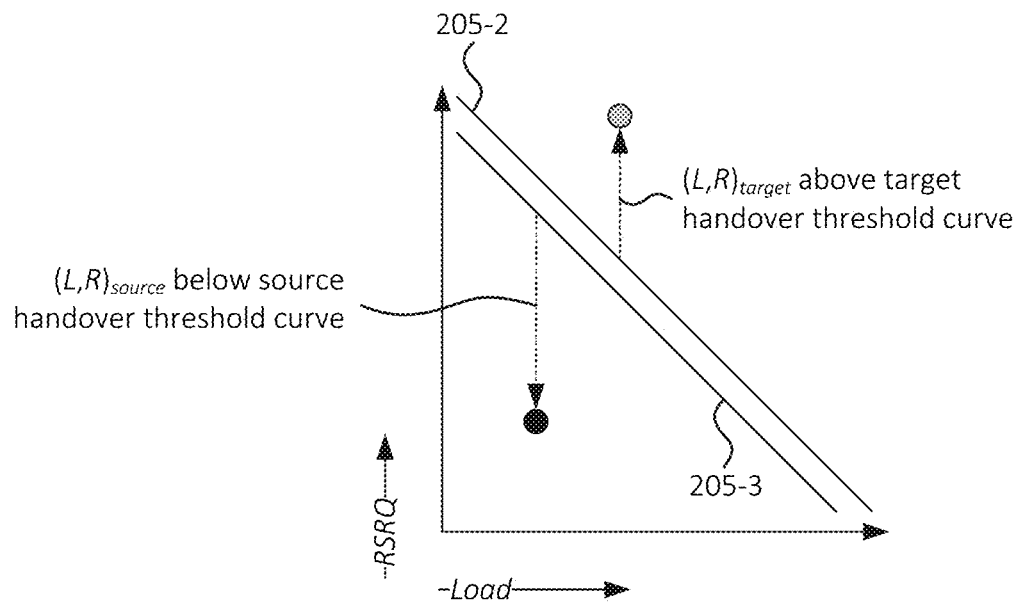
FIG. 5 illustrates example load metrics and signal metrics associated with a source cell and a potential target cell based on which a handover condition may be identified, in accordance with some embodiments.
Figure 6:
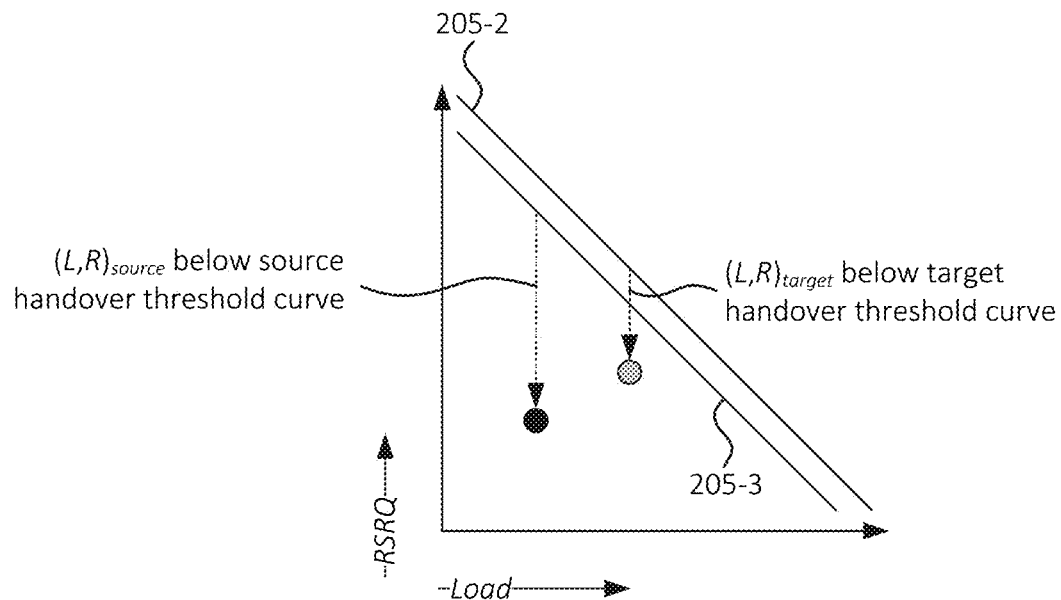
FIG. 6 illustrates example load metrics and signal metrics associated with a source cell and a potential target cell based on which a handover condition may not be identified, in accordance with some embodiments.

FIG. 5 illustrates an example situation in which a handover condition associated with UE 101 may be determined, and FIG. 6 illustrates an example situation in which a handover condition associated with UE 101 may not be determined (e.g., UE 101 may remain connected to source cell 103-1 rather than being handed over to potential target cell 103-2). As shown in FIG. 5, for example, assume that an RSRQ value, as measured by UE 101, associated with source cell 103-1 is lower than a handover threshold indicated by handover curve 205-3 for a particular measure of load associated with source cell 103-1. Additionally, in this example, an RSRQ value, as measured by UE 101, associated with potential target cell 103-2 is higher than a handover threshold indicated by handover curve 205-2 for a particular measure of load associated with potential target cell 103-2.

Such a situation may be represented by a first point on a graph, reflecting the RSRQ values and load metrics associated with source cell 103-1 (where such point is denoted in FIG. 5 as $(L,R)_{source}$), being below threshold curve 205-3 associated with source cell 103-1, and further by a second point on the graph, reflecting the RSRQ values and load metrics associated with potential target cell 103-2 (e.g., $(L,R)_{target}$), being above threshold curve 205-2 associated with potential target cell 103-2. Given these values for load metrics and utilization metrics (e.g., RSRQ values) associated with UE 101, source cell 103-1, and potential target cell 103-2, UE 101 may be handed over from source cell 103-1 to potential target cell 103-2.

On the other hand, as shown in FIG. 6, even though $(L,R)_{source}$ is below threshold curve 205-3 associated with source cell 103-1, a handover condition associated with UE 101 may not be determined, as $(L,R)_{target}$ is also below threshold curve 205-2 associated with potential target cell 103-2. That is, since both thresholds are not met (e.g., $(L,R)_{source}$ below threshold curve 205-3 and $(L,R)_{target}$ above threshold curve 205-2), a handover condition associated with UE 101 may not be determined. Such values may reflect a situation in which signal quality associated with source cell 103-1 is relatively low, but where signal quality associated with potential target cell 103-2 is also relatively low, and a handover may not necessarily provide substantial positive impact (e.g., improvement in performance, load, efficiency, etc.) to UE 101 and/or cells 103.

Similarly, in situations where $(L,R)_{source}$ and $(L,R)_{target}$ are above threshold curves 205-3 and 205-2, respectively, a handover condition associated with UE 101 may not be determined. For example, such situation may occur when signal quality associated with source cell 103-1 is relatively high, and a handover may not necessarily provide substantial positive impact to UE 101 and/or cells 103.

Figure 7:
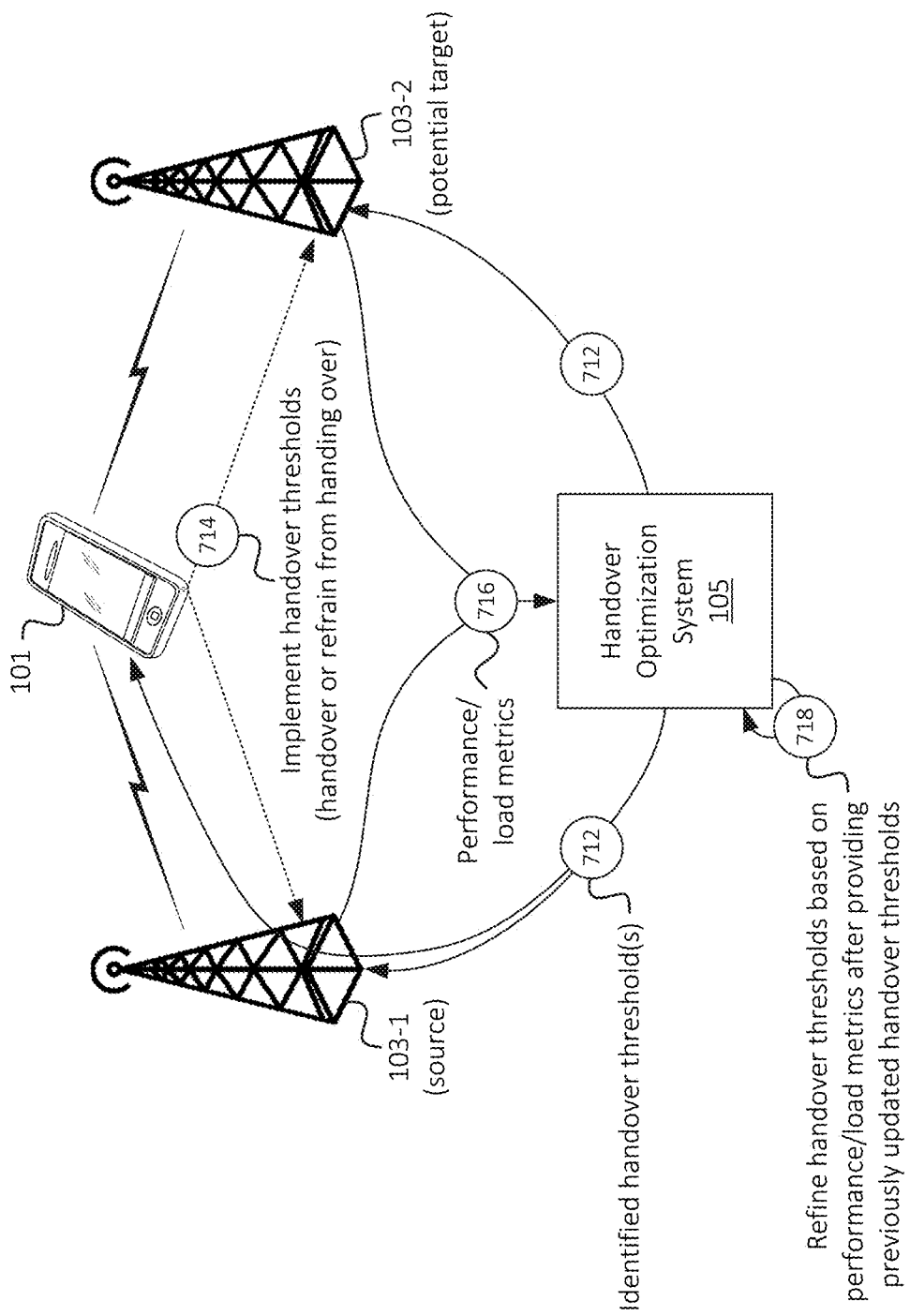
FIG. 7 illustrates an example of implementing and/or refining handover thresholds, in accordance with some embodiments.

As shown in FIG. 7, once HOS 105 identifies (at 110) the sets of handover thresholds (e.g., handover threshold curves 205) associated with UE 101, source cell 103-1, and potential target cell 103-2, HOS 105 may provide (at 712) the handover thresholds to UE 101, source cell 103-1, and/or potential target cell 103-2. In some embodiments, HOS 105 may provide (at 712) the handover thresholds to UE 101 and/or source cell 103-1, and may forgo providing the handover thresholds to potential target cell 103-2.

The handover thresholds may be implemented by UE 101, source cell 103-1, and/or potential target cell 103-2. For example, in some embodiments, source cell 103-1 may receive (e.g., via an X2 interface or other suitable communication pathway) load metrics from potential cell 103-2 and/or some other suitable device or system that monitors and/or provides such information. Source cell 103-1 may also receive RSRQ values, as measured by UE 101, indicating signal quality (e.g., RSRQ metrics or other utilization-based signal metrics) between UE 101 and source cell 103-1, as well as between UE 101 and potential target cell 103-2.

Accordingly, as similarly discussed above, source cell 103-1 may determine whether to perform a handover of UE 101 from source cell 103-1 to potential target cell 103-2 based on the handover thresholds received (at 712) from HOS 105, load metrics associated with source cell 103-1, load metrics associated with potential target cell 103-2, signal quality and/or utilization metrics between UE 101 and source cell 103-1, and signal quality and/or utilization metrics between UE 101 and potential target cell 103-2. In some embodiments, UE 101 may receive (at 712) handover thresholds from HOS 105 as well as load information from source cell 103-1 and potential target cell 103-2, and may determine (at 714) whether to request a handover from source cell 103-1 to potential target cell 103-2. In some embodiments, potential target cell 103-2 may receive load information from source cell 103-1 and/or some other device or system that monitors and/or provides such information, and may receive signal quality and/or utilization metrics from UE 101, source cell 103-1, and/or some other device or system that monitors and/or provides such information. In such embodiments, potential target cell 103-2 may determine (at 714) whether to request a handover of UE 101 from source cell 103-1 to potential target cell 103-2. In some embodiments, HOS 105 may receive load information from cells 103-1 and 103-2 and signal quality and/or utilization information from UE 101 (e.g., one or more devices or systems that monitor and/or provide such information), and may determine whether to request or initiate a handover of UE 101 from source cell 103-1 to potential target cell 103-2.

Figure 8:
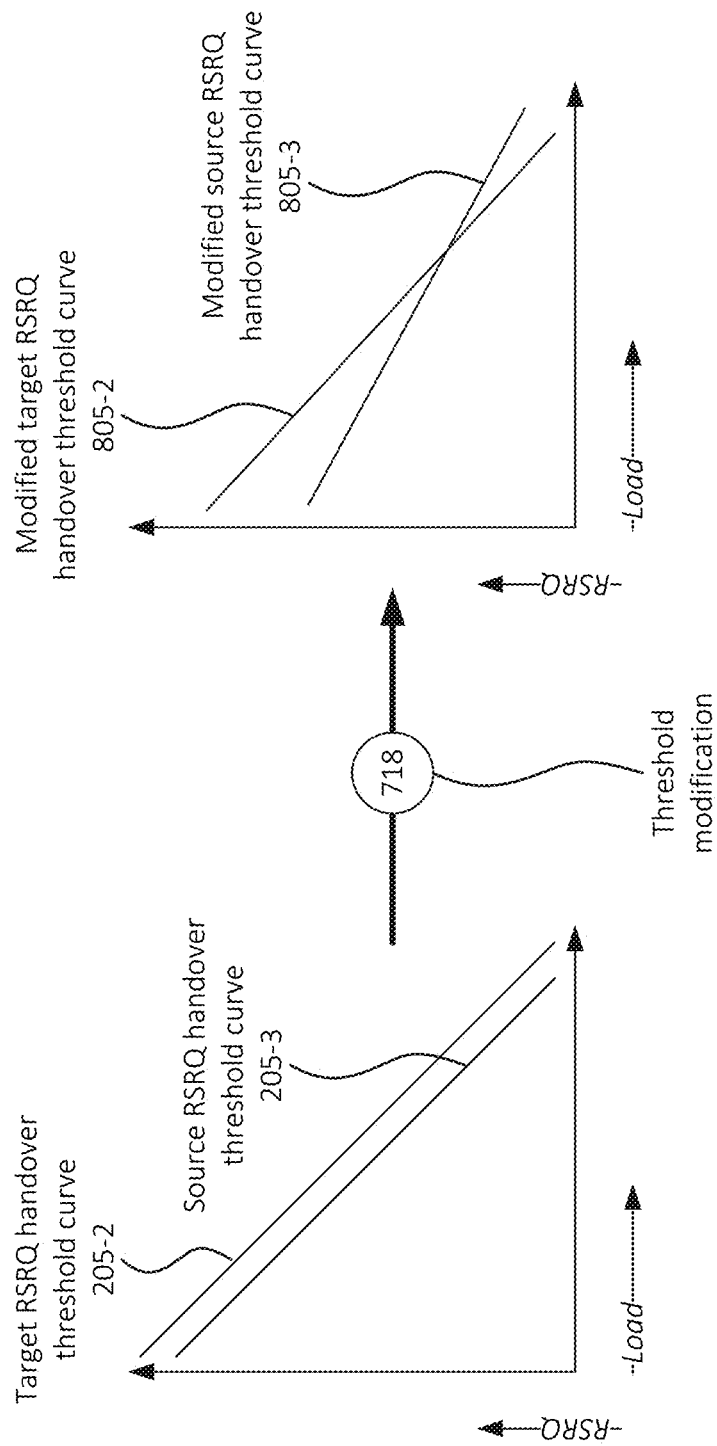
FIG. 8 illustrates an example modification of one or more handover threshold curves, in accordance with some embodiments.

HOS 105 may continue to receive (at 716) performance and/or load metrics from cells 103, based on which HOS 105 may modify, refine, etc. (at 718) models 201 and/or handover threshold curves 205 in an ongoing basis. For example, as shown in FIG. 8, handover threshold curves 205-2 and 205-3 associated with source cell 103-1 and potential target cell 103-2, respectively, may be replaced (at 718) by modified threshold curves 805-2 and 805-3, respectively.

HOS 105 may, in some embodiments, use AI/ML techniques or other suitable techniques to determine whether increasing, decreasing, and/or otherwise modifying one or more handover thresholds may cause a given UE 101 to be handed over, may cause a given UE 101 not to be handed over, may be associated with a relatively higher measure of performance associated with UE 101 and/or cells 103, may be associated with a relatively lower measure of performance associated with UE 101 and/or cells 103, etc. Generally, for example, HOS 105 may modify such models 201 and/or handover threshold curves 205 in order to optimize the performance, efficiency, and/or other metrics of UE 101 and/or cells 103.

Figure 9:
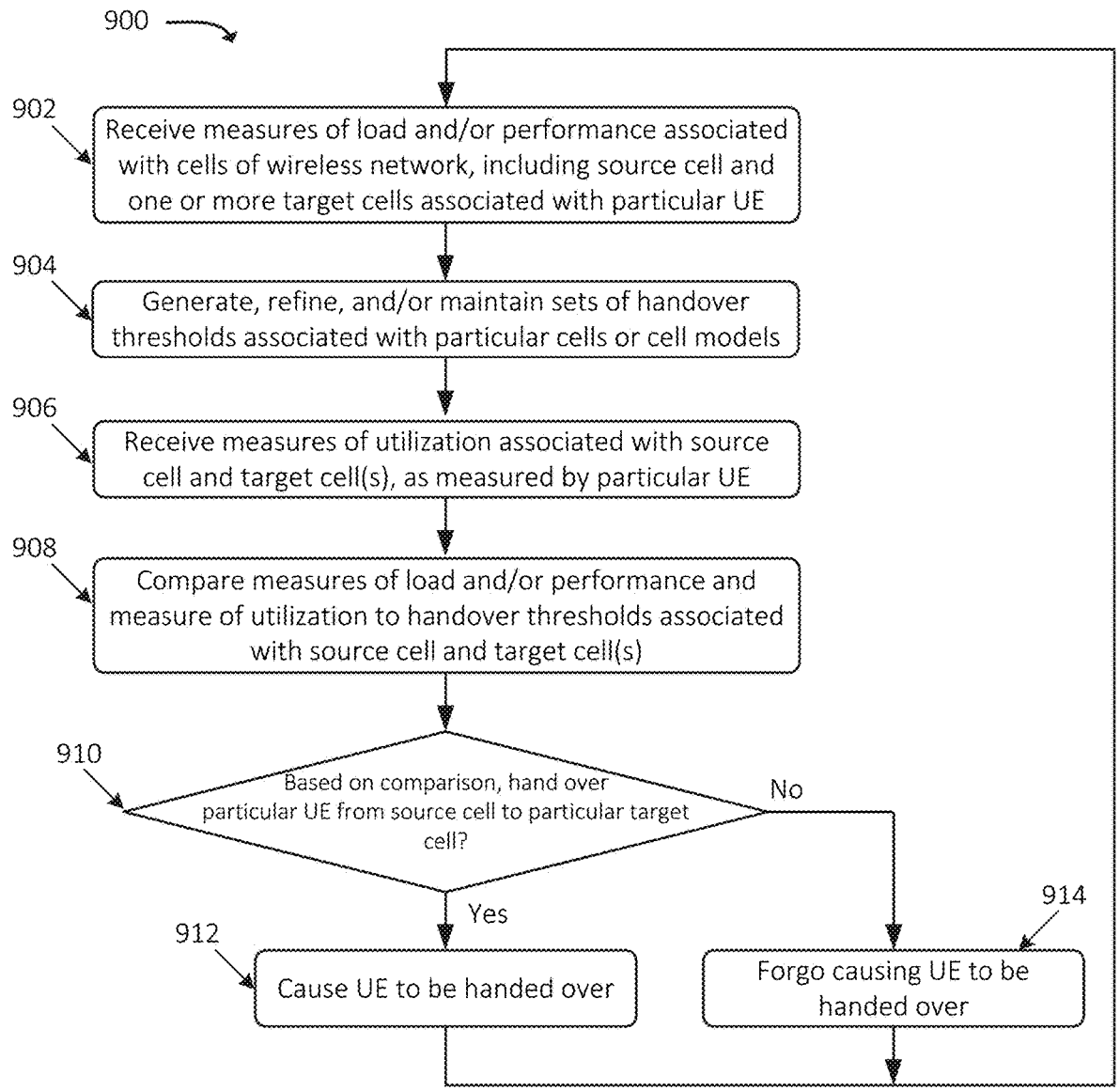
FIG. 9 illustrates an example process for identifying one or more handover thresholds based on utilization metrics associated with two or more cells, as determined by a UE, and further based on load metrics associated with the two or more cells, in accordance with some embodiments.

FIG. 9 illustrates an example process 900 for identifying one or more sets of handover thresholds (e.g., threshold curves 205) based on utilization metrics associated with two or more cells 103, as determined by a particular UE 101, and further based on load metrics associated with the two or more cells 103. In some embodiments, some or all of process 900 may be performed by HOS 105. In some embodiments, one or more other devices may perform some or all of process 900 in concert with, and/or in lieu of, HOS 105.

As shown, process 900 may include receiving (at 902) measure of load and/or performance associated with two or more cells 103 of a wireless network, including a source cell 103 to which a particular UE 101 is connected and one or more potential target cells 103 with respect to the particular UE 101. For example, the one or more potential target cells 103 may be cells 103 from which UE 101 has detected wireless signals and is able to determine measures of signal strength, quality, etc. (e.g., RSSI values, RSRQ values, SINR values, etc.). As noted above, the measures of load and/or performance associated with a given cell 103 may include and/or may be based on a quantity of UEs 101 connected to cell 103, an amount of traffic (e.g., bandwidth, throughput, etc.) wirelessly outputted by cell 103 over a given timeframe, an amount of traffic wirelessly received by cell 103 over a given timeframe, a quantity or proportion of resources (e.g., RF resources) of cell 103 utilized over a given timeframe, QoS metrics associated with one or more UEs 101 connected to cell 103, and/or other suitable performance and/or load metrics. HOS 105 may receive (at 902) such information on an ongoing basis, such that HOS 105 is able to monitor performance and/or load metrics associated with the two or more cells 103 over time.

Process 900 may further include generating, refining, and/or maintaining (at 904) sets of handover thresholds associated with the two or more cells 103 and/or cell models 201 with which the two or more cells 103 are associated. As noted above, cell models 201 may be based on attributes or configuration parameters of cells 103, and such cell models 201 may be identified based on a comparison of attributes of the particular two or more cells 103 to attributes and/or features 203 of respective cell models 201. As noted above, respective cell models 201 may include and/or may be associated with respective handover threshold curves 205, indicating threshold values of utilization metrics (and/or of metrics that are based on or that indicate measures of utilization of cells 103, as determined by UE 101) as a function of cell load.

Process 900 may additionally include receiving (at 906) measures of utilization associated with source cell 103 and the one or more potential target cells 103, as measured by the particular UE 101, and/or based on metrics measured by the particular UE 101. For example, UE 101 may measure RSRQ values associated with source cell 103 and the one or more potential target cells 103, where RSRQ values are based on and/or that indicate measures of utilization associated with cells 103. As another example, HOS 105 may receive other measures of utilization and/or signal quality, associated with cells 103, as measured or determined by UE 101.

Process 900 may also include comparing (at 908) the measures of load and/or performance (e.g., as received at 902) and the measures of utilization (e.g., as received at 906) to handover threshold curves 205 associated with source cell 103 and potential target cells 103. For example, as discussed above (e.g., with respect to FIGS. 5 and 6), HOS 105 may determine a relationship of the measure of load and/or performance and the measure of utilization associated with a particular cell 103 to a particular handover threshold curve 205 associated with the particular cell 103. In some embodiments, HOS 105 may provide the handover threshold curves 205 to the source cell 103, the one or more potential target cells 103, and/or to UE 101, based on which the source cell 103, the one or more potential target cells 103, and/or to UE 101 may compare (at 908) the measures of load and/or performance and the measures of utilization to handover threshold curves 205 associated with source cell 103 and/or potential target cells 103.

Process 900 may further include determining (at 910) whether to hand over the particular UE 101 from the source cell 103 to a particular potential target cell 103. For example, as discussed in greater detail above, if the measure of utilization of the source cell 103 is below a threshold measure of utilization as a function of the load of the source cell 103 (e.g., based on the particular handover threshold curve 205 associated with the source cell 103), a handover condition may be determined. Additionally, or alternatively, if the measure of utilization of the particular potential target cell 103 is below a threshold measure of utilization as a function of the load of the potential target cell 103 (e.g., based on the particular handover threshold curve 205 associated with the potential target cell 103), a handover condition may be determined.

If the determination based on the comparing (at 910—YES) is that UE 101 should be handed over, then process 900 may include causing (at 912) UE 101 to be handed over to the potential target cell 103. For example, as discussed above, HOS 105 may output an instruction or indication to UE 101, the source cell 103, and/or the potential target cell 103 that UE 101 should be handed over. Additionally, or alternatively, UE 101 and/or the particular potential target cell 103 may output a request to the source cell 103 to hand UE 101 over to the particular potential target cell 103. In some embodiments, source cell 103 may initiate a handover of UE 101 to the particular potential target cell 103 based on a request from UE 101 or the particular potential target cell 103, and/or based on determining (at 910) that UE 101 should be handed over to the particular potential target cell 103.

On the other hand, if the determination based on the comparing (at 910—NO) is that UE 101 should not be handed over, then process 900 may include forgoing (at 914) causing UE 101 to be handed over to the potential target cell 103. For example, as discussed above, HOS 105 may forgo outputting an instruction or indication to UE 101, the source cell 103, and/or the potential target cell 103 that UE 101 should be handed over. Additionally, or alternatively, UE 101 and/or the particular potential target cell 103 may forgo outputting a request to the source cell 103 to hand UE 101 over to the particular potential target cell 103. In some embodiments, source cell 103 may forgo initiating a handover of UE 101 to the particular potential target cell 103 based on determining (at 910) that UE 101 should not be handed over to the particular potential target cell 103.

In some embodiments, the handover condition may be based on one or more other factors, such as whether UE 101 has detected at least a threshold measure of signal strength from target cell 103. For example, in situations where the measure of utilization of the source cell 103 is below the threshold measure of utilization as a function of the load of the source cell 103 and/or the measure of utilization of the particular potential target cell 103 is below the threshold measure of utilization as a function of the load of the potential target cell 103, a handover condition may not be determined if a signal strength metric or other suitable metric (e.g., RSRP, SINR, etc.) associated with the potential target cell 103 is below a threshold. As another example, given the same relative measures of utilization of source cell 103 and potential target cell 103 as in the above example, a handover condition may not be determined if a measure of load associated with potential target cell 103 is above a threshold (e.g., if potential target cell 103 is overloaded), and/or a handover condition may be determined if the measure of load associated with potential target cell 103 is below the threshold (e.g., if potential target cell 103 is not overloaded). In other words, in some embodiments, the respective RSRQ values (or other utilization-based metrics) associated with source cell 103 and potential target cell 103 may be a factor based on which a handover condition is determined, even though the example provided above describe RSRQ values as dipositive in determining a handover condition.

Some or all of process 900 may be repeated in an iterative manner, such that the sets of handover threshold curves 205 associated with particular cells 103 and/or cell models 201 may be refined over time using AI/ML techniques or other suitable techniques. For example, as discussed above, HOS 105 may identify performance and/or load metrics associated with cells 103 after a handover is performed (at 912) or not performed (at 914) based on a given set of load and/or performance metrics, utilization metrics, and handover thresholds, in order to determine whether the determination (at 910) of whether to hand UE 101 over yielded an optimal, acceptable, etc. result.

Figure 10:
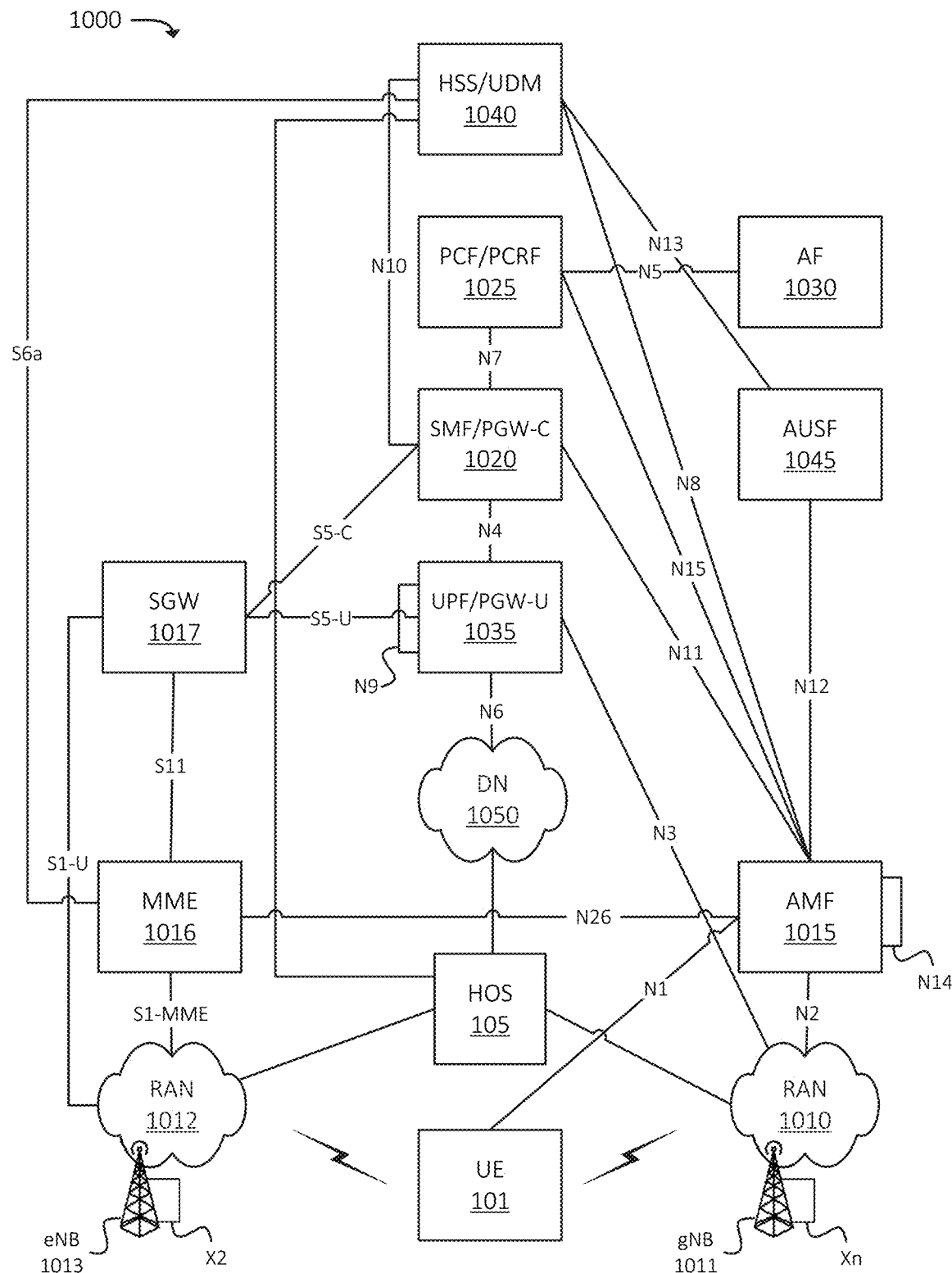
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT")

may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 101, RAN 1010 (which may include one or more gNBs 1011), RAN 1012 (which may include one or more eNBs 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as HOS 105.

The example shown in FIG. 10 illustrates one instance of each network component or function (e.g., one instance of SMF/PGW-C 1020, PCF/PCRF 1025, UPF/PGW-U 1035, HSS/UDM 1040, and/or AUSF 1045). In practice, environment 1000 may include multiple instances of such components or functions. For example, in some embodiments, environment 1000 may include multiple "slices" of a core network, where each slice includes a discrete and/or logical set of network functions (e.g., one slice may include a first instance of SMF/PGW-C 1020, PCF/PCRF 1025, UPF/PGW-U 1035, HSS/UDM 1040, and/or AUSF 1045, while another slice may include a second instance of SMF/PGW-C 1020, PCF/PCRF 1025, UPF/PGW-U 1035, HSS/UDM 1040, and/or AUSF 1045). The different slices may provide differentiated levels of service, such as service in accordance with different QoS parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 101 may include a computation and communication device, such as a wireless mobile communication device that is capable of communicating with RAN 1010, RAN 1012, and/or DN 1050. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 101 may communicate with one or more other elements of environment 1000. UE 101 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 101 via the air interface, and may communicate the traffic to UPF/PGW-U 1035, and/or one or more other devices or networks. Similarly, RAN 1010 may receive traffic intended for UE 101 (e.g., from UPF/PGW-U 1035, AMF 1015, and/or one or more other devices or networks) and may communicate the traffic to UE 101 via the air interface. In some embodiments, cell 103 may be, may include, and/or may be implemented by one or more gNBs 1011.

RAN 1012 may be, or may include, a LTE RAN that includes one or more base stations (e.g., one or more eNBs 1013), via which UE 101 may communicate with one or more other elements of environment 1000. UE 101 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 101 via the air interface, and may communicate the traffic to UPF/PGW-U 1035, and/or one or more other devices or networks. Similarly, RAN 1010 may receive traffic intended for UE 101 (e.g., from UPF/PGW-U 1035, SGW 1017, and/or one or more other devices or networks) and may communicate the traffic to UE 101 via the air interface. In some embodiments, cell 103 may be, may include, and/or may be implemented by one or more eNBs 1013.

AMF 1015 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1012 and/or eNBs 1013, and/or to perform other operations.

SGW 1017 may include one or more devices, systems, VNFs, CNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, CNFs, etc., that gather, process, store, and/or provide information in a manner described herein. SMF/PGW-C 1020 may, for example, facilitate the establishment of communication sessions on behalf of UE 101. In some embodiments, the establishment of communications sessions may be performed in accordance with one or more policies provided by PCF/PCRF 1025.

PCF/PCRF 1025 may include one or more devices, systems, VNFs, CNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, CNFs, etc., that receive, store, and/or provide information that may be used in determining parameters (e.g., quality of service parameters, charging parameters, or the like) for certain applications.

UPF/PGW-U 1035 may include one or more devices, systems, VNFs, CNFs, etc., that receive, store, and/or provide data (e.g., user plane data). For example, UPF/PGW-U 1035 may receive user plane data (e.g., voice call traffic, data traffic, etc.), destined for UE 101, from DN 1050, and may forward the user plane data toward UE 101 (e.g., via RAN 1010, SMF/PGW-C 1020, and/or one or more other devices). In some embodiments, multiple UPFs 1035 may be deployed (e.g., in different geographical locations), and the delivery of content to UE 101 may be coordinated via the N9 interface (e.g., as denoted in FIG. 10 by the line marked "N9" originating and terminating at UPF/PGW-U 1035). Similarly, UPF/PGW-U 1035 may receive traffic from UE 101 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, CNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 101.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 101 may communicate, through DN 1050, with data servers, other UEs 101, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 101 may communicate.

Figure 11:
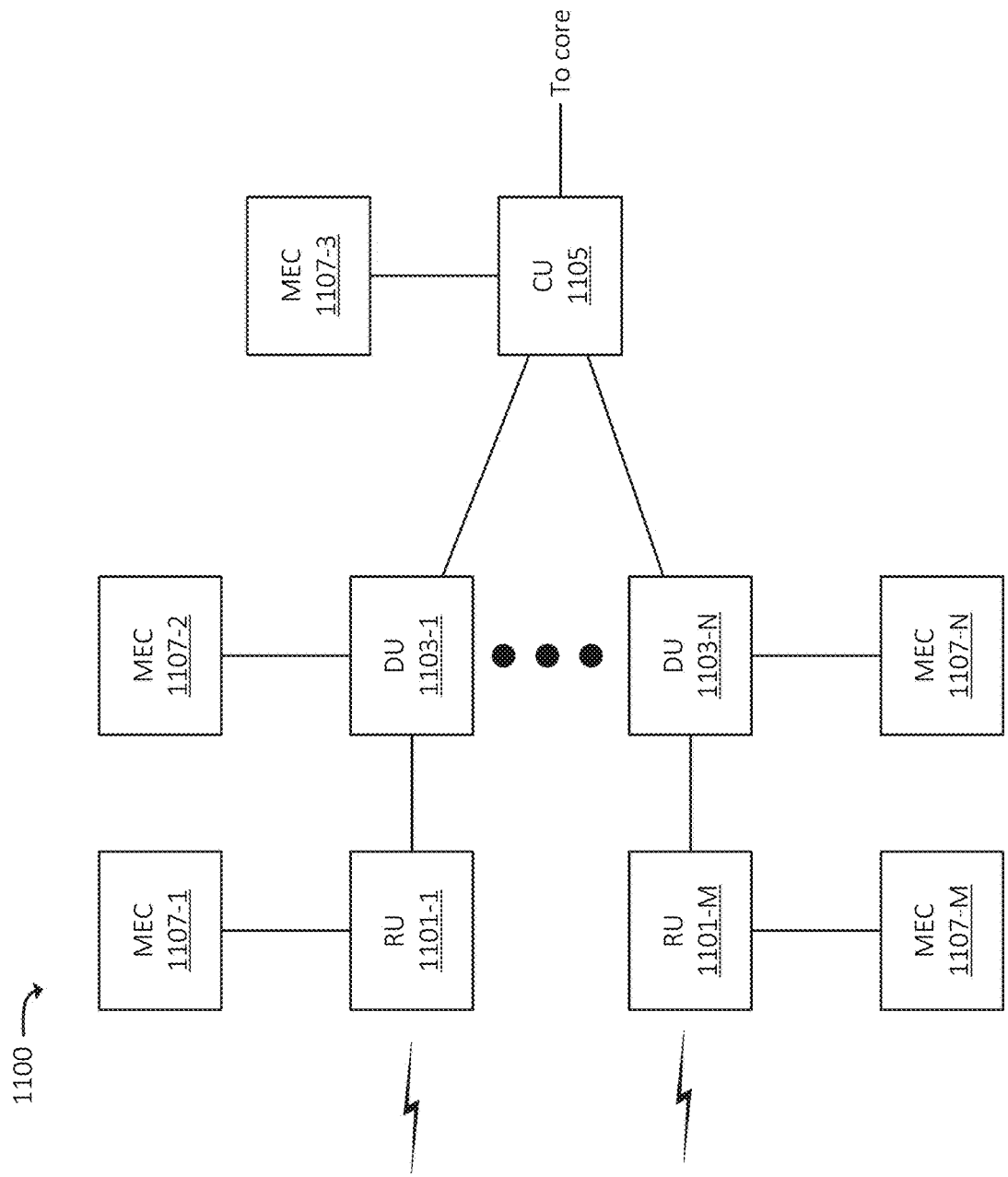
FIG. 11 illustrates an example arrangement of a RAN, in accordance with some embodiments.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 101 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 101, and may determine which DU(s) 1103 should receive the downlink traffic. DU 1103 may include one or more devices that transmit traffic between a core network (e.g., via CU 1105) and UE 101 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 101.

RU 1101 may include hardware circuitry (e.g., one or more RF transceivers, antennas, radios, and/or other suitable hardware) to communicate wirelessly (e.g., via an RF interface) with one or more UEs 101, one or more other DUs 1103 (e.g., via RUs 1101 associated with DUs 1103), and/or any other suitable type of device. In the uplink direction, RU 1101 may receive traffic from UE 101 and/or another DU 1103 via the RF interface and may provide the traffic to DU 1103. In the downlink direction, RU 1101 may receive traffic from DU 1103, and may provide the traffic to UE 101 and/or another DU 1103.

RUs 1101 may, in some embodiments, be communicatively coupled to one or more Multi-Access/Mobile Edge Computing ("MEC") devices, referred to sometimes herein simply as "MECs" 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 101, via a respective RU 1101.

For example, RU 1101-1 may route some traffic, from UE 101, to MEC 1107-1 instead of to a core network (e.g., via DU 1103 and CU 1105). MEC 1107-1 may process the traffic, perform one or more computations based on the received traffic, and may provide traffic to UE 101 via RU 1101-1. In this manner, ultra-low latency services may be provided to UE 101, as traffic does not need to traverse DU 1103, CU 1105, and an intervening backhaul network between DU network 1100 and the core network. In some embodiments, MEC 1107 may include, and/or may implement, some or all of the functionality described above with respect to HOS 105, UPF 1035, and/or one or more other devices, systems, VNFs, CNFs, etc.

Figure 12:
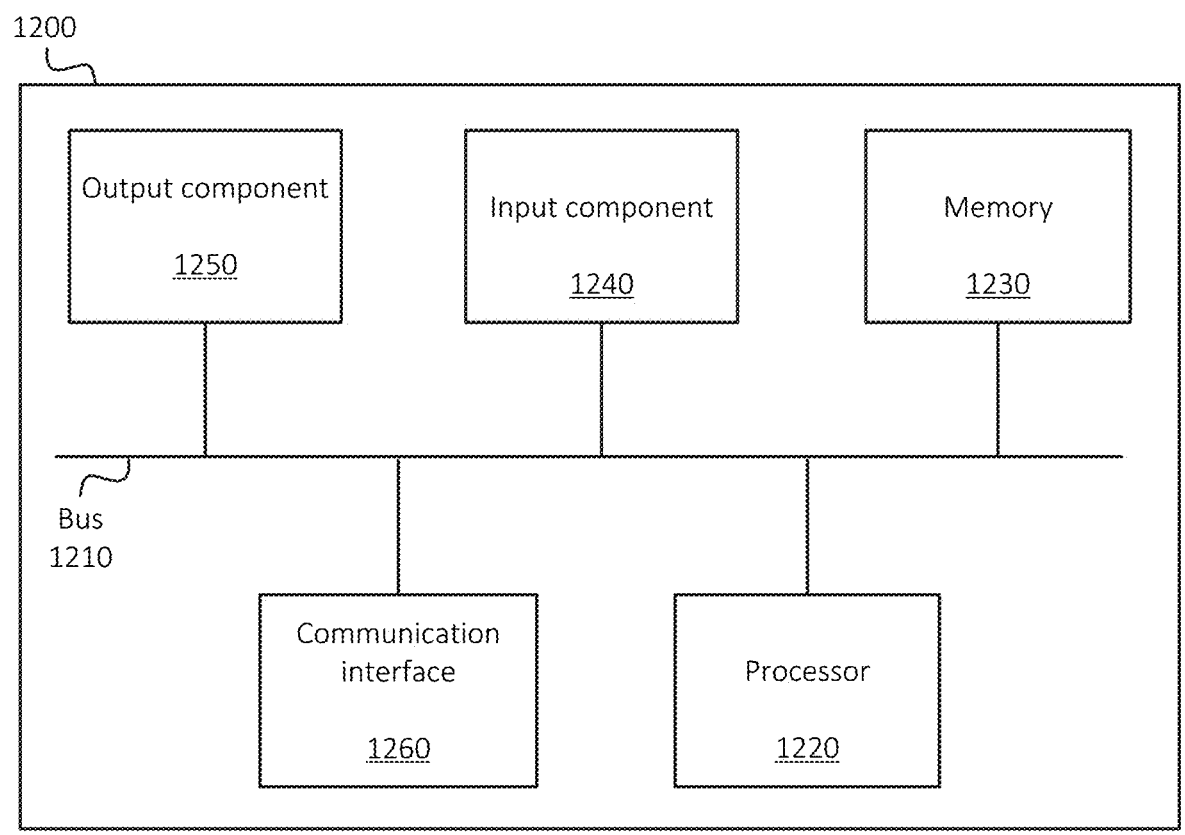
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while handover threshold curves 205 are shown in the figures as straight lines, in practice, handover threshold curves 205 may take other shapes or forms, such as exponential curves, logarithmic curves, irregular curves, and/or other suitable shapes. Additionally, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive a first measure of load associated with a first cell of a wireless network;
   receive a first measure of utilization associated with the first cell, as determined by a User Equipment ("UE") that is connected to the first cell;
   receive a second measure of load associated with a second cell of a wireless network, wherein the second measure of load is a same type of measure of load as the first measure of load;
   receive a second measure of utilization associated with the second cell, as determined by the UE, wherein the second measure of utilization is a same type of measure of utilization as the first measure of utilization;
   compare the first measure of utilization to a first threshold measure of utilization that is specified by a first set of thresholds, wherein the first set of thresholds specifies a first threshold measure of utilization that is associated with the first measure of load;
   determine that the first measure of utilization is greater than the first threshold measure of utilization;
   compare the second measure of utilization to a second threshold measure of utilization that is specified by a second set of thresholds, wherein the second set of thresholds specifies a second threshold measure of utilization that is associated with the second measure of load, wherein the first and second sets of thresholds are different sets of thresholds;
   determine that the second measure of utilization is less than the second threshold measure of utilization;
   determine that the UE should be handed over from the first cell to the second cell, based on:
      determining that the first measure of utilization, associated with the first cell, is greater than the first threshold measure of utilization, and
      determining that the second measure of utilization, associated with the second cell, is less than the second threshold measure of utilization; and
   cause the UE to be handed over from the first cell to the second cell based on the determining.

2. The device of claim 1, wherein the first set of thresholds include a first function of a plurality of measures of load, and wherein the second set of thresholds include a second function of the plurality of measures of load.

3. The device of claim 1, wherein the first measure of utilization is associated with a first Reference Signal Received Quality ("RSRQ") value associated with the first cell, and wherein the second measure of utilization is associated with a second RSRQ value associated with the second cell.

4. The device of claim 1, wherein the measure of utilization is determined by the UE based on one or more measurements performed by the UE, wherein the UE begins performing the one or more measurements based on the first measure of cell load exceeding a threshold measure of cell load.

5. The device of claim 1, wherein the first measure of load is based on at least one of:
   a quantity of UEs connected to the first cell,
   an amount of wireless traffic sent by the first cell,
   a measure of utilization of Physical Resource Blocks ("PRBs") of the first cell over a particular time window, or
   an amount of wireless traffic received by the first cell.

6. A non-transitory computer-readable medium, storing a plurality of processor-executable instructions to:
   receive a first measure of load associated with a first cell of a wireless network;
   receive a first measure of utilization associated with the first cell, as determined by a User Equipment ("UE") that is connected to the first cell;
   receive a second measure of load associated with a second cell of a wireless network, wherein the second measure of load is a same type of measure of load as the first measure of load;
   receive a second measure of utilization associated with the second cell, as determined by the UE, wherein the second measure of utilization is a same type of measure of utilization as the first measure of utilization;
   compare the first measure of utilization to a first threshold measure of utilization that is specified by a first set of thresholds, wherein the first set of thresholds specifies a first threshold measure of utilization that is associated with the first measure of load;
   determine that the first measure of utilization is greater than the first threshold measure of utilization;
   compare the second measure of utilization to a second threshold measure of utilization that is specified by a second set of thresholds, wherein the second set of thresholds specifies a second threshold measure of utilization that is associated with the second measure of load, wherein the first and second sets of thresholds are different sets of thresholds;
   determine that the second measure of utilization is less than the second threshold measure of utilization;
   determine that the UE should be handed over from the first cell to the second cell, based on:

determining that the first measure of utilization, associated with the first cell, is greater than the first threshold measure of utilization, and determining that the second measure of utilization, associated with the second cell, is less than the second threshold measure of utilization; and cause the UE to be handed over from the first cell to the second cell based on the determining.

7. The non-transitory computer-readable medium of claim 6, wherein the first set of thresholds includes a first function of a plurality of measures of load, and wherein the second set of thresholds includes a second function of the plurality of measures of load.

8. The non-transitory computer-readable medium of claim 6, wherein the first measure of utilization is associated with a first Reference Signal Received Quality ("RSRQ") value associated with the first cell, and wherein the second measure of utilization is associated with a second RSRQ value associated with the second cell.

9. The non-transitory computer-readable medium of claim 6, wherein the measure of utilization is determined by the UE based on one or more measurements performed by the UE, wherein the UE begins performing the one or more measurements based on the first measure of cell load exceeding a threshold measure of cell load.

10. The non-transitory computer-readable medium of claim 6, wherein the first measure of load is based on at least one of:
a quantity of UEs connected to the first cell,
an amount of wireless traffic sent by the first cell,
a measure of utilization of Physical Resource Blocks ("PRBs") of the first cell over a particular time window, or
an amount of wireless traffic received by the first cell.

11. A method, comprising:
receiving a first measure of load associated with a first cell of a wireless network;
receiving a first measure of utilization associated with the first cell, as determined by a User Equipment ("UE") that is connected to the first cell;
receiving a second measure of load associated with a second cell of a wireless network, wherein the second measure of load is a same type of measure of load as the first measure of load;
receiving a second measure of utilization associated with the second cell, as determined by the UE, wherein the second measure of utilization is a same type of measure of utilization as the first measure of utilization;
comparing the first measure of utilization to a first threshold measure of utilization that is specified by a first set of thresholds, wherein the first set of thresholds specifies a first threshold measure of utilization that is associated with the first measure of load;
determining that the first measure of utilization is greater than the first threshold measure of utilization;
comparing the second measure of utilization to a second threshold measure of utilization that is specified by a second set of thresholds, wherein the second set of thresholds specifies a second threshold measure of utilization that is associated with the second measure of load, wherein the first and second sets of thresholds are different sets of thresholds;
determining that the second measure of utilization is less than the second threshold measure of utilization;

determining that the UE should be handed over from the first cell to the second cell, based on:
determining that the first measure of utilization, associated with the first cell, is greater than the first threshold measure of utilization, and
determining that the second measure of utilization, associated with the second cell, is less than the second threshold measure of utilization; and
causing the UE to be handed over from the first cell to the second cell based on the determining.

12. The method of claim 11, wherein the first set of thresholds includes a first function of a plurality of measures of load, and wherein the second set of thresholds includes a second function of the plurality of measures of load.

13. The method of claim 11, wherein the first measure of utilization is associated with a first Reference Signal Received Quality ("RSRQ") value associated with the first cell, and wherein the second measure of utilization is associated with a second RSRQ value associated with the second cell.

14. The method of claim 11, wherein causing the UE to be handed over from the first cell to the second cell includes outputting an instruction to the first cell to initiate a handover of the UE to the second cell.

15. The method of claim 11, wherein the second set of thresholds includes a third threshold measure of utilization that is associated with the same first measure of load with which the first threshold measure of utilization is associated, wherein the first and third threshold measures of utilization are different.

16. The method of claim 11, wherein determining that the first measure of utilization is greater than the first threshold measure of utilization includes determining that a Reference Signal Received Quality ("RSRQ") value determined by the UE, with respect to the first cell, is less than a threshold RSRQ value.

17. The device of claim 1, wherein the second set of thresholds includes a third threshold measure of utilization that is associated with the same first measure of load with which the first threshold measure of utilization is associated, wherein the first and third threshold measures of utilization are different.

18. The device of claim 1, wherein determining that the first measure of utilization is greater than the first threshold measure of utilization includes determining that a Reference Signal Received Quality ("RSRQ") value determined by the UE, with respect to the first cell, is less than a threshold RSRQ value.

19. The non-transitory computer-readable medium of claim 6, wherein the second set of thresholds includes a third threshold measure of utilization that is associated with the same first measure of load with which the first threshold measure of utilization is associated, wherein the first and third threshold measures of utilization are different.

20. The non-transitory computer-readable medium of claim 6, wherein determining that the first measure of utilization is greater than the first threshold measure of utilization includes determining that a Reference Signal Received Quality ("RSRQ") value determined by the UE, with respect to the first cell, is less than a threshold RSRQ value.

* * * * *